(12) United States Patent
Rochford et al.

(10) Patent No.: US 9,134,544 B2
(45) Date of Patent: Sep. 15, 2015

(54) EYEGLASSES AND FRAMES THEREFOR

(71) Applicant: MAC TECHNOLOGIES LIMITED, Ramsey, Isle of Man (GB)

(72) Inventors: Robert A. Rochford, Riverview, FL (US); Mark Best, Merritt Island, FL (US)

(*) Notice: Subject to any disclaimer, the term of this patent is extended or adjusted under 35 U.S.C. 154(b) by 15 days.

(21) Appl. No.: 13/924,680

(22) Filed: Jun. 24, 2013

(65) Prior Publication Data

US 2014/0375946 A1    Dec. 25, 2014

(51) Int. Cl.
| | |
|---|---|
| G02C 5/08 | (2006.01) |
| G02C 5/16 | (2006.01) |
| G02C 5/00 | (2006.01) |
| G02C 5/14 | (2006.01) |
| G02C 5/22 | (2006.01) |
| G02C 3/04 | (2006.01) |

(52) U.S. Cl.
CPC ........ *G02C 5/006* (2013.01); *G02C 3/04* (2013.01); *G02C 5/08* (2013.01); *G02C 5/14* (2013.01); *G02C 5/143* (2013.01); *G02C 5/2254* (2013.01); *G02C 5/2272* (2013.01)

(58) Field of Classification Search
CPC .......... G02C 3/003; G02C 5/006; G02C 5/08; G02C 5/10; G02C 5/2254; G02C 5/16

USPC ............... 351/52, 63–82, 111–123, 124, 140, 351/157; 16/211, 228; 40/1.5; 242/370, 379
See application file for complete search history.

(56) References Cited

U.S. PATENT DOCUMENTS

| | | | |
|---|---|---|---|
| 2,975,426 A * | 3/1961 | Rabb | 2/13 |
| 3,395,964 A | 8/1968 | Neider dit Chartrice | |
| 4,886,349 A | 12/1989 | Willis | |
| 5,719,655 A | 2/1998 | Peschel et al. | |
| 6,427,254 B1 | 8/2002 | Gardner | |
| 6,540,349 B1 * | 4/2003 | Liesegang | 351/63 |
| 7,059,717 B2 | 6/2006 | Block | |
| 7,455,402 B2 * | 11/2008 | Gerber et al. | 351/63 |
| 2006/0268222 A1 * | 11/2006 | Tracy | 351/157 |
| 2007/0121061 A1 | 5/2007 | Kim | |
| 2009/0008288 A1 * | 1/2009 | Burnstein | 206/575 |
| 2009/0287211 A1 * | 11/2009 | Fila et al. | 606/42 |

* cited by examiner

*Primary Examiner* — Darryl J Collins
*Assistant Examiner* — Kristina Deherrera
(74) *Attorney, Agent, or Firm* — Cowan, Liebowitz & Latman, P.C.

(57) ABSTRACT

A frame for eyeglasses comprising a front frame portion adapted to support lenses and first and second side portions extending from opposing sides of the front frame portion and configured to end at a user's temples so as to be supported by the user's temples when worn, without being supported by the user's ears.

20 Claims, 17 Drawing Sheets

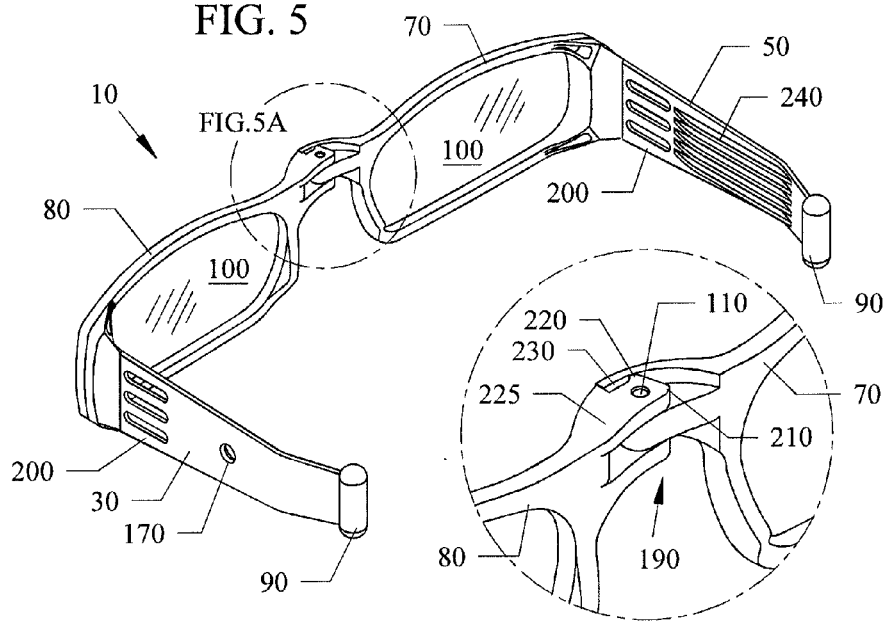
FIG. 5
FIG. 5A
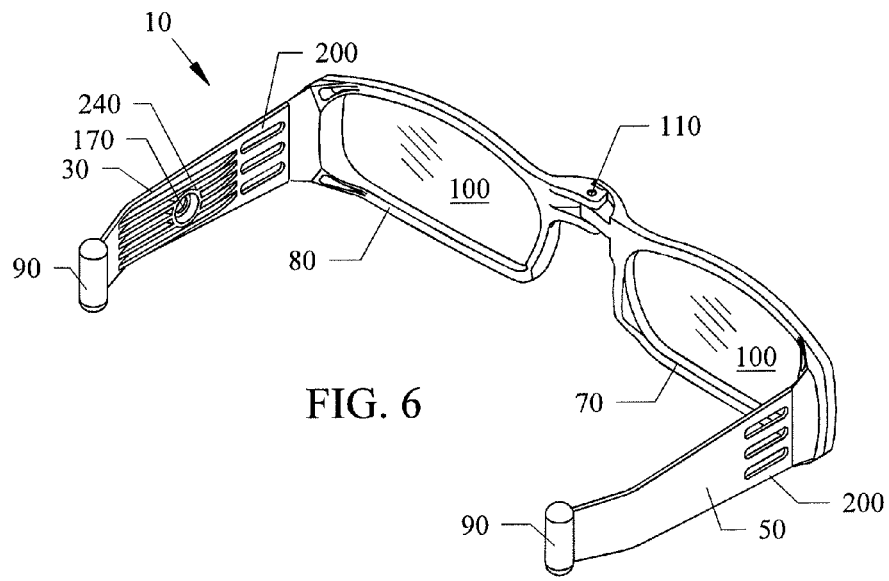
FIG. 6

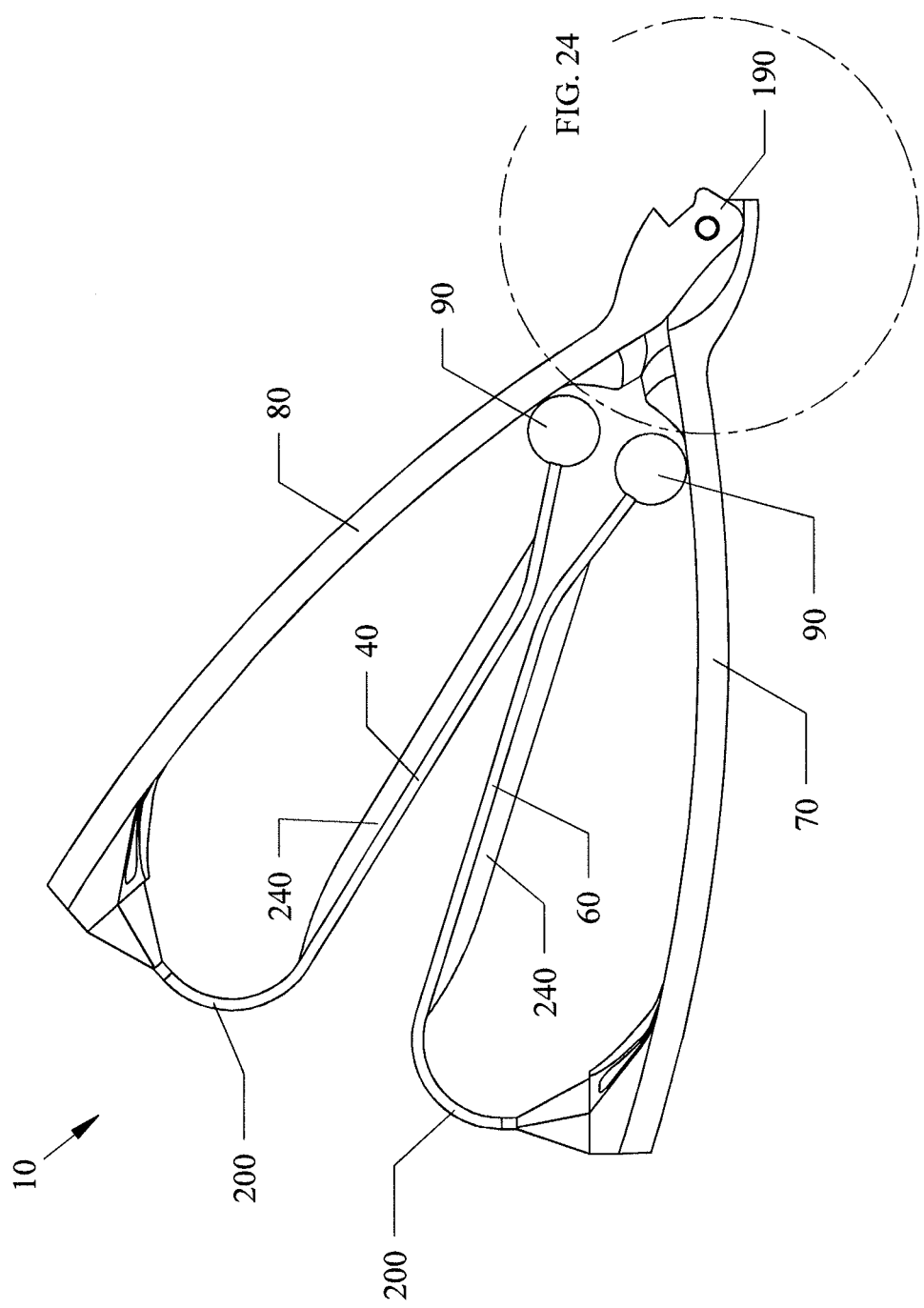

EYEGLASSES AND FRAMES THEREFOR

BACKGROUND OF THE INVENTION

1. Field of the Invention

The present invention relates generally to eyeglasses (or "glasses") and frames therefor, and, more particularly, to eyeglasses and eyeglass frames that collapse to a convenient size with very little effort. The present invention also relates to frames for glasses including temple rests (i.e., sides) that gently rest on temples of a user instead of over the user's ears.

2. Description of the Related Art

Eyeglasses include frames bearing lenses worn in front of the eyes. They are normally used for vision correction and/or eye protection. Eyeglasses also include safety glasses which are worn to protect the eye against flying debris, chemicals or against visible and near visible light or radiation. Sunglasses are another type of eyeglasses that allow better vision in bright daylight, and may protect against damage from high levels of ultraviolet light such as Ultraviolet A (UVA) and Ultraviolet B (UVB) light.

Configurations of glasses have remained substantially the same for the past 200 years. For example, bifocals which were invented and worn by Benjamin Franklin over 200 years ago have a strikingly similar configuration to that of typical glasses worn today. Conventional configurations of glasses may have various problems associated with them. One such problem is that conventional glasses may be uncomfortable and may irritate a wearer's ears by placing pressure thereon. Another problem is that typical glasses may not remain very stable with respect to the wearer's face and may shift around. Another age old problem associated with conventional configurations of glasses is easy misplacement or loss of the glasses. Yet another problem is that conventional glasses take up an inordinate amount of space when not being worn, and require a sufficiently large storage case when stored.

SUMMARY OF THE INVENTION

Accordingly, there is a need for configurations of glasses that are easy to store, are comfortable when worn, and are easy to find when not in use. The above and other objectives are realized in a frame for eyeglasses comprising a front frame portion adapted to support lenses, and first and second side portions extending from opposing sides of the front frame portion and configured to end at a user's temples so as to be supported by the user's temples when worn, without being supported by the user's ears. In certain embodiments, the front frame portion comprises a right frame component adapted to support a first lens and a left frame component adapted to support a second lens, and the right frame component and the left frame component are hingedly connected by a frame hinge, the frame hinge allowing the right frame component and the left frame component to fold with respect to one another. The frame hinge includes a first locking portion for retaining the right and left frame components in an unfolded state and a second locking portion for retaining the right and left frame components in a folded state.

In some embodiments, the first side portion is integrally formed with the front frame portion and is hinged relative to the front frame portion by a first living hinge, and the second side portion is integrally formed with the front frame portion and is hinged relative to the front frame portion by a second living hinge. Each of the first and second living hinges may include one or more openings therein for increasing flexibility of the first and second living hinges and each of the first and second side portions may include at least one stiffening rib for reducing flexibility of the first and second side portions. Moreover, in some embodiments, the first side portion includes a first tip formed at an end thereof and the second side portion includes a second tip formed at an end thereof, and the first and second tips are configured to contact with a user's temples when worn by the user. At least the first and second side portions are formed from a memory polymer material. The first and second tips may be formed from the same memory polymer material as the first and second side portions or may be formed from a different material. In certain embodiments, the first and second side portions are formed from the memory polymer material while the first and second tips are formed from a softer material than the memory polymer material, such as one of a low durometer rubber and silicone rubber.

The frame may further include a coupling portion adapted to releasably couple with a connection assembly for connecting the frame to a user or a user's clothing. The coupling portion may comprise an opening in one of the first and second side portions adapted to receive a male snap portion of the connection assembly.

An eye glass assembly comprising a collapsible eyeglass frame and a connection assembly for releasably connecting the collapsible frame to a user or a user's clothing is also disclosed. In the eye glass assembly, the collapsible eyeglass frame includes: a right frame component adapted to support a first lens, a left frame component adapted to support a second lens, a first side portion extending from the right frame component, a second side portion extending from the left frame component, and a coupling portion adapted to releasably couple with the connection assembly. In the collapsible eyeglass frame, the right frame component and the left frame component are hingedly connected to one another by a frame hinge and are foldable with respect to one another, and the first side portion is foldable with respect to the right frame component, while the second side portion is foldable with respect to the left frame component. In the eyeglass assembly, the connection assembly includes a connecting member, a first coupling member provided at a first end of the connecting member and configured to releasably couple with the coupling portion of the collapsible frame, and a second coupling member provided at a second end of the connecting member and configured to releasably couple with a user or a user's clothing. In certain embodiments, the connecting member comprises a lanyard, and the second coupling member includes a clip for coupling with a user or a user's clothing and a housing that encloses a retractable reel assembly coupled to the second end of the lanyard for retracting the lanyard therein and allowing extension of the lanyard therefrom. The retractable reel assembly may be a spring-loaded retractable reel assembly, and the second coupling member may further include a release mechanism for locking and releasing the lanyard relative to the spring-loaded retractable reel assembly. In some embodiments, the second coupling member comprises a holster adapted to store the collapsible frame and a clip for coupling the holster with a user or a user's clothing.

BRIEF DESCRIPTION OF THE DRAWINGS

The above and other features and aspects of the present invention will become more apparent upon reading the following detailed description of an illustrative embodiment thereof, in conjunction with the accompanying drawings, in which:

FIGS. 5 and 5A show a rear left perspective view of the eyeglass assembly with deployed temple rests, including a detailed view of hinge components;

FIG. 6 is a rear right perspective view of the eyeglass assembly of FIG. 5;

FIG. 23 is a top view of the eyeglass assembly of FIG. 18 with a hinge detail;

FIGS. 27 and 27A-G show an alternative configuration of temple tips of the eyeglass assembly of FIGS. 1-23.

DETAILED DESCRIPTION

Figure 1:
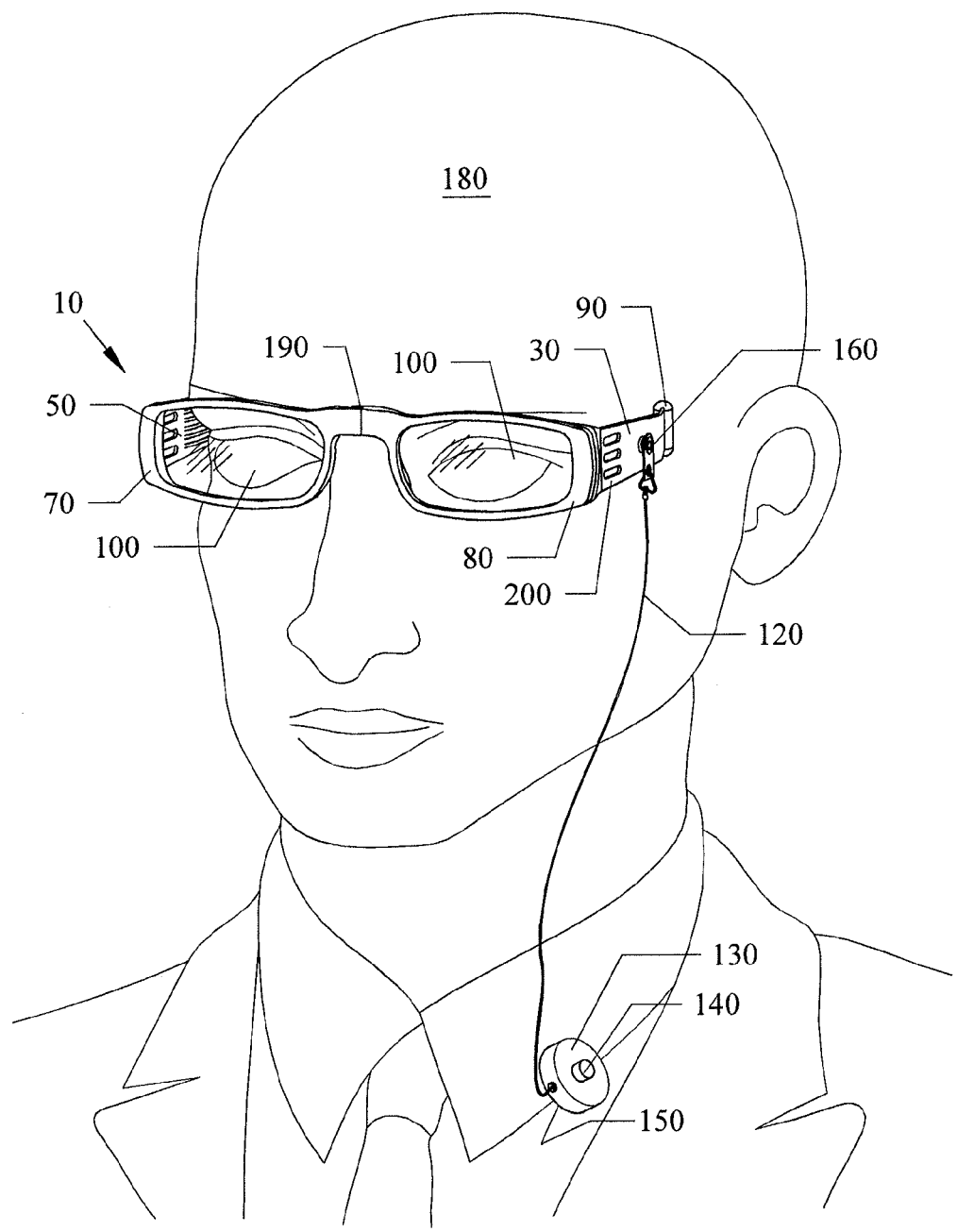
FIG. 1 shows an eyeglass assembly of the present invention being worn by a wearer, with a retractable lanyard clipped to the wearer's collar.

The present invention is directed to collapsible eyeglasses ("glasses"), or an eyeglass assembly, and frames therefor that may be folded and easily stored. The present invention is also directed to glasses and frames therefor that rest on a wearer's temples instead of over and behind the wearer's ears. The same reference numbers may be used throughout the drawings to refer to the same or similar parts. A description of a part of the invention that has been previously described may be omitted from subsequent drawing descriptions.

FIGS. 1-23 shows an illustrative embodiment of the collapsible eyeglasses, or eyeglass assembly, in which the glasses 10 are worn by a wearer and are attached to a shirt collar of the wearer by a connecting member comprising a retractable lanyard or cord 120. The glasses 10 comprise a frame which in the present illustrative embodiment, includes a right frame component 70 and a left frame component 80 (also referred to as first and second frame components). Each of the right frame component 70 and the left frame component 80 is adapted to support, and supports, a lens 100, which may be a reading lens, a colored lens, a polarized lens, a darkened lens and/or a photochromic or transition lens. The right frame component 70 and left frame component 80 are connected to one another and are hinged with respect to one another by a frame hinge 190 (also referred to as a central frame hinge). An illustrative configuration of the frame hinge 190 is shown in more detail in FIGS. 5A and 24A-D, and is described in more detail below. The right and left frame components 70, 80 may be formed from any suitable materials, including but not limited to a memory polymer, plastic, titanium, aluminum, beryllium, flexon, stainless steel, zylonite, nylon, blended nylon, and other materials. The lenses 100 are also formed from any materials suitable for lenses, including, but not limited to, glass, plastic, polycarbonate, and other materials. The shapes of the right and left frame components are not limited to those shown in FIGS. 1-23 and may be varied to provide a desired appearance of the glasses.

As shown in FIGS. 1-23, the frame of the glasses 10 also includes left and right side components 30, 50 (also referred to as temple rests), which are adapted to contact with and rest on a wearer's temple areas. In the illustrative embodiment shown, the temple rests extend from their respective frame components 70, 80 and up to a wearer's temple area, without extending to the wearer's ear and without being supported by the wearer's ear. It is understood that the length of the temple rests may be varied, depending on the wearer's preferences and needs. The left frame component 80 is connected to a left temple rest 30 via a hinge 200 (also referred to as a side hinge) so that the left temple rest 30 can be folded or deployed (unfolded) with respect to the left frame component 80. Similarly, right frame component 70 is connected to the right temple rest 50 via a similar hinge 200 so that the right temple rest 50 can be folded or deployed (unfolded) with respect to the right frame component 70. The hinge 200 connecting the respective frame component with the respective temple rest can be any suitable hinge including, but not limited to a living hinge, a spring or spring-loaded hinge, a stop hinge, a rivet hinge, a barrel hinge, an interlocking hinge, or any other suitable hinge. The hinge 200 connection between the respective temple rest and the respective frame component allows the temple rest to be folded so that the temple rest extends substantially along the frame component, as shown in FIGS. 4 and 17-23. In the illustrative embodiment shown in FIGS. 1-23, the hinge 200 is a living hinge, or a flexure bearing hinge, and in FIGS. 1-3, 5-10, 13-15, both the right temple rest 50 and the left temple rest 30 are shown as deployed (i.e., unfolded) with respect to their respective right and left frame components 70, 80. In certain illustrative embodiments, the right temple rest 50 is integrally formed with the right frame component 70, and the left temple rest 30 is integrally formed with the left frame component 80, and the hinge 200 between the respective temple rest and the respective frame component is a flexible living hinge. However, in other illustrative embodiments, the right temple rest 50 is formed separately from the right frame component 70, and the left temple rest 30 is formed separately from the left frame component 80, and the hinge 200 couples the respective temple rest with the respective frame component.

Each temple rest includes a first end, which is coupled with, or is integrally formed with, the respective frame component, and an opposing second end, which is adapted to rest against a wearer's temple when the glasses are worn. As can be seen in FIGS. 1-10 and 13-23, the left temple rest 30 includes a temple tip 90 provided at the second end thereof, and the temple tip 90 is in contact with the temple and/or head of the wearer 180, without being supported by the wearer's ear. Although not visible in FIG. 1, the configuration of the right temple rest 50 is similar to that of the left temple rest 30 and also includes a similar temple tip provided at the second end thereof, as can be seen in the other Figures. Each temple tip 90 in this illustrative embodiment forms a thickened end of the temple rest that protrudes at least in a direction toward the wearer's temple and/or head. In the embodiment of FIGS. 1-23, the temple tips 90 have a rounded tip configuration. However, in other embodiments, the configuration of the temple tips may be varied. For example, FIG. 27 shows another illustrative embodiment of the glasses 10 of the present invention which have a modified configuration of the temple tips, and FIGS. 27A-F show more detailed views of the temple tips. As shown in FIGS. 27 and 27A-F, the temple tips have a more elongated configuration so that they have an oval or substantially rectangular cross-section along the line D-D, shown in FIGS. 27C and 27D. As can be seen in FIGS. 27 and 27A-F, the temple tips are separately formed from the left and right temple rests 30, 50 and are slipped onto and/or attached to the ends of the temple rests. In both embodiments, each temple tip 90 provides a point of contact between the user's temple and the glasses so that the glasses are supported on the wearer's temples by the temple tips 90. The temple tips 90 shown in FIGS. 27 and 27A-F have a greater surface area adapted to be in contact with a wearer's temples when the glasses frames are worn, as compared to the temple tips 90 shown in FIGS. 1-23. Moreover, the temple tips 90 allow for a snug and comfortable fit of the glasses during wear.

In certain embodiments of the invention, the left and right temple rests 30, 50 are formed from a memory polymer, which is sufficiently flexible so as that the temple rests can be bent or adjusted to the particular shape of the wearer's head and retain their configuration after such adjustment when worn by the wearer. Memory polymers used for forming the right and left frame components and the right and left temple rests include plastics with nylon and other high grade polymers based on polyamides, such as amorphous polyamides, partially aromatic polyamides and/or cycloaliphatic polyamides. In certain embodiments, the frame components and/or the temple rests are formed from a cycloaliphatic amorphous polyamide material Grilamid TR 90, manufactured by EMS-GRIVORY. The Grilamid TR 90 material has UV resistance, a low density (about 1.06 ISO 1183, dry g/cm$^3$), very high fatigue strength (about 32 DIN 53442, 23° C. MPa), high resistance to stress cracking in both polar media and non-polar media (about 42-58 MPa). In addition, Grilamid TR 90 material has desired flexibility, which is important for the present invention. In other embodiments, the frame components and/or the temple rests are formed from Polyamide-Nylon 12 (also referred to as Polyamide 12 or PA 12), which has desired properties relating to flexibility and strength of the material, including 290-300% elongation at break, hardness (Rockwell) of about R84-107 and tensile strength of 50-55 MPa. Other flexible plastic materials having similar mechanical properties may be used for forming the frame of the glasses 10. Suitable flexible plastic materials for use in at least the temple rests of the frame will have the following properties: Flexural modulus (MPa) of about 1000-3000, Elongation at Yield (%) of 3-10% and Elongation at Break (%) being greater than 50%. As mentioned above, in some embodiments, the left and right frame components are formed from the same materials as the temple rests. However, in other embodiments, the left and right frame components may be formed from harder, less flexible materials than the temple rests, including but not limited to harder plastics, metals and other suitable materials.

The temple tips 90 may be formed from the same or different material as the temple rests. In certain embodiments, the temple tips 90 are formed from materials that are softer than the materials forming the temple rests. In particular, low durometer rubber, silicone rubber (e.g., molded liquid silicone rubber) or any other soft materials having a hardness of about 40 Shore A or less, and preferably a hardness of about 20-30 Shore A. In addition, all or a portion of the outer surface of the temple tips 90 may include a 3-dimensional pattern, such as a cross-hatching or a hash pattern, or multiple indentations or grooves into the thickness of the material in order to improve the support of the frame by the temple tips 90 on the wearer's temples and to reduce slippage. In some embodiments, a portion of the outer surface of the temple tips 90 which is adapted to contact the wearer's temples includes the 3-dimensional pattern or indentations or grooves into the thickness of the material.

With the above construction of the frames, the glasses provide the wearer with a customized and comfortable fit with and the temple rests of the glasses provide stability and support to the glasses during wear. Although not shown in FIGS. 1-23, the temple rests may be coated with a material that allows for a more comfortable wear, such as a soft or pliable rubber or silicone-type material. Alternatively, a covering may be used for each temple tip to improve the comfort of wear, which may be formed from any suitable materials, such as foam, silicone-type materials, textile materials, etc.

The configuration of the frame for the glasses 10 described above provides a number of advantages over the conventional, over the ear design. In particular, the frame for the glasses 10 of the present invention provides a comfortable fit for the wearer by eliminating the need for support of the glasses by the wearer's ears. Instead, the glasses 10 of the present invention are gently supported on the wearer's temples. In addition, the frame for the glasses 10 of the present invention provides for a customized fit to the wearer's head by allowing adjustment of the temple rests, thus improving comfort during wear. Moreover, the configuration of the frame is compact in size, which allows easier storage of the glasses 10 in smaller compartments. The collapsibility of the frame is further improved by allowing the glasses to be folded at the central frame hinge 190 in addition to the side hinges 200.

Figure 2:
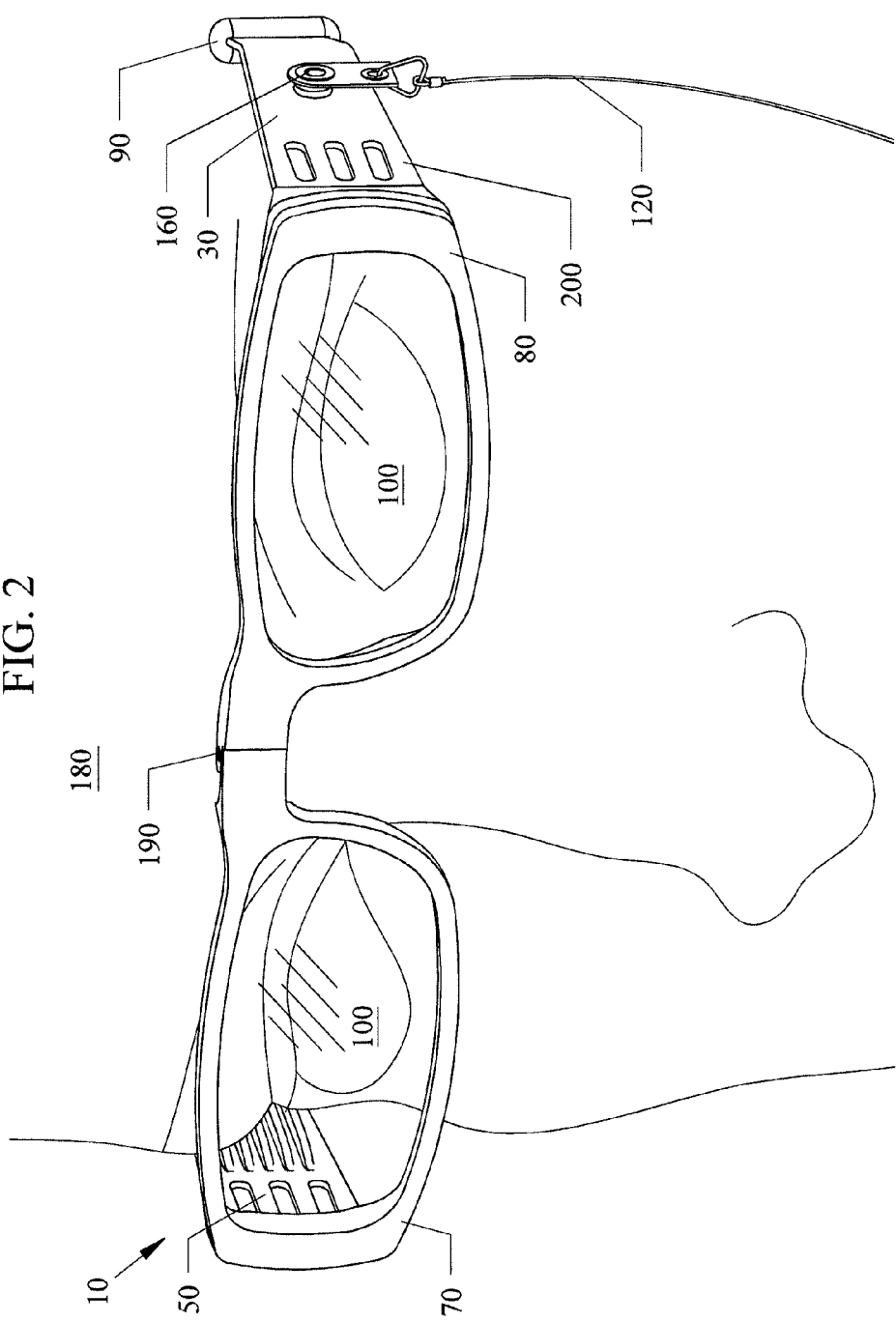
FIG. 2 is an enlarged detailed view of FIG. 1.

As shown in FIGS. 1 and 2, the frame of the glasses 10 is releasably connected to the wearer or wearer's clothing by a connection assembly, which includes a connecting member 120, a first coupling member or assembly 160 which releasably couples one end of the connecting member 120 to the glasses 10 and a second coupling member or assembly 130 which releasably couples the other end of the connecting member to the wearer or wearer's clothing. In the illustrative embodiment shown in FIGS. 1 and 2, the connecting member 120 comprises a lanyard, cord, string, wire or the like, and the second coupling assembly 130 comprises a retractable reel assembly, which may be in a form of a spring loaded reel assembly, for winding the connecting member 120 thereon and from which the connecting member 120 extends. The second coupling assembly 130 is adapted to attach to the wearer or wearer's clothing, such as a collar, pocket, ID lanyard, inside pocket of the wearer's jacket, or any other piece of clothing, accessory and/or body part of the wearer 180. The illustrative second coupling assembly 130, shown in FIG. 3, includes a spring clip 150 which is used for attaching the second coupling assembly 130 to the wearer or wearer's clothing. However, it is understood that any other form of attachment may be used instead of the spring clip, including, but not limited to, a tie clip, a buckle clip, a safety clip, a badge clip, one or more magnets, and the like. As also shown in FIG. 3, the second coupling assembly 130 includes an opening through which the connecting member passes from an internal reel mechanism (not shown) to the outside of the second coupling assembly 130 so that the connecting member 120 can be extended outward by pulling on the connecting member and retracted into the second coupling assembly.

Figure 4:
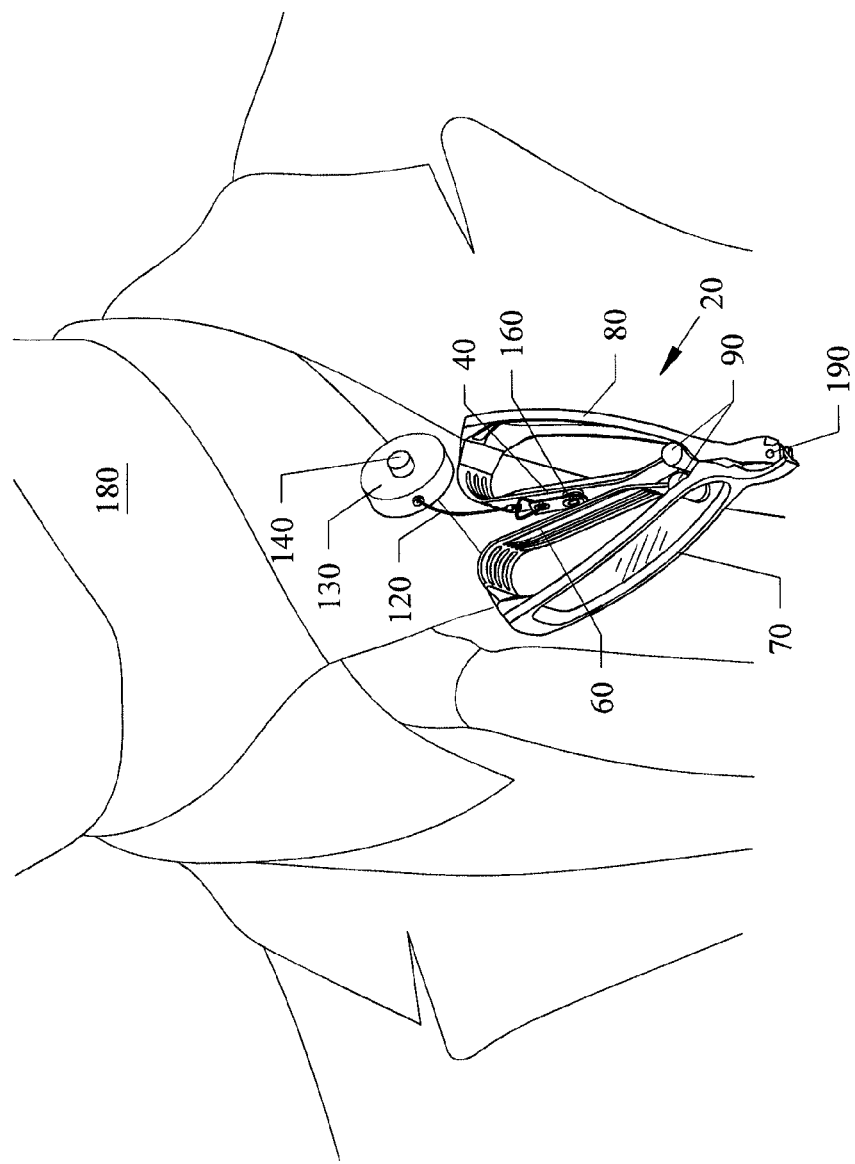
FIG. 4 shows the eyeglass assembly in a folded state and hanging from the lanyard.

As shown in FIGS. 1 and 4, the second coupling assembly 130 also includes a lock/release mechanism or button 140 for locking an extended position of the connecting member 120 relative to the second coupling assembly or for releasing the extended position of the connecting member 120 so that the connecting member 120 is caused to wrap around an internal reel of the second coupling assembly 130. A wearer 180 or a third party may activate the lanyard lock/release button 140 so that the connecting member 120 is released from its extended position and/or so that the connecting member 120 locks into an extended position. For example, when a wearer 180 takes the glasses 10 off, the wearer can activate the lock/release button 140 on the second coupling assembly 130 to release the extended position of the connecting member and to allow the connecting member 120 to be pulled inside the second coupling assembly so as to be stored therein. It is understood that other mechanisms than a releasable spring loaded reel may be used in the second coupling assembly.

Figure 3:
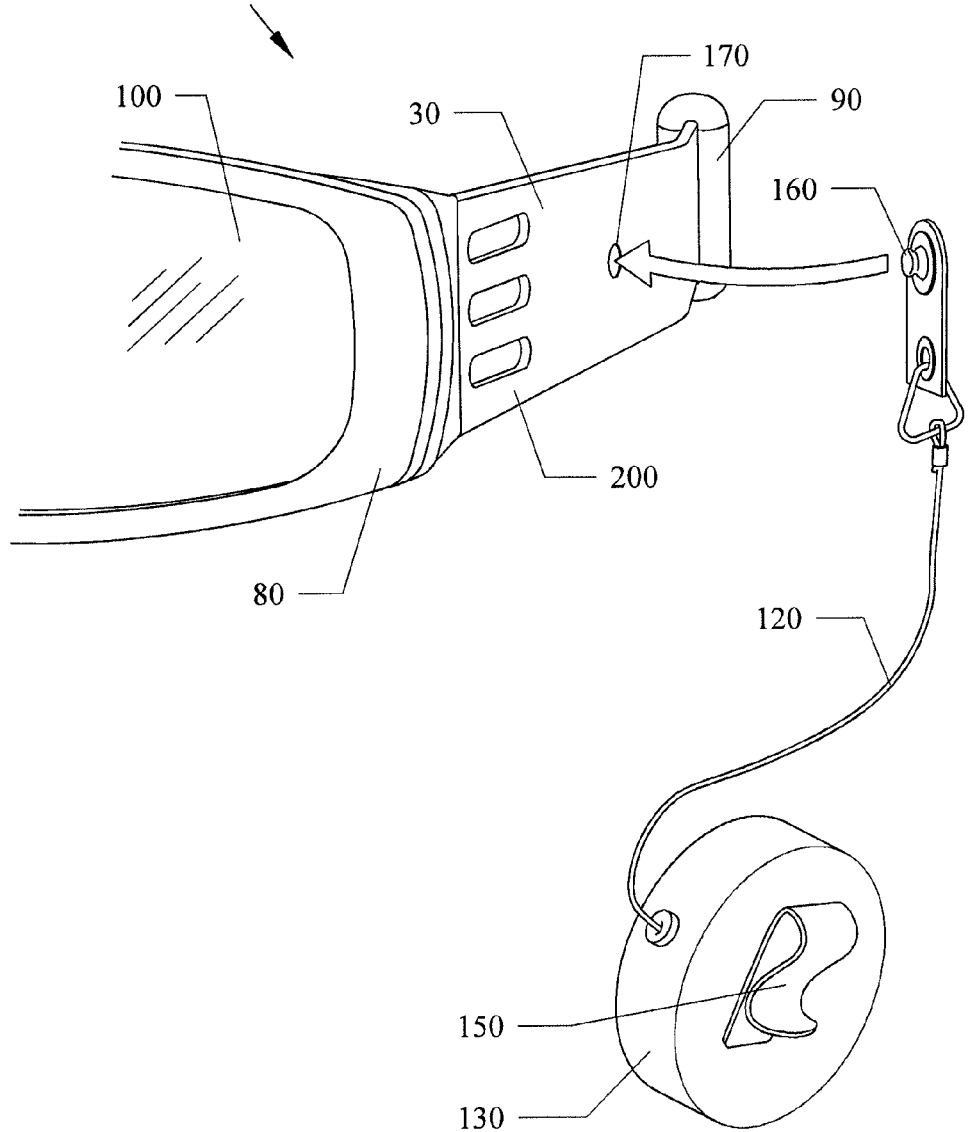
FIG. 3 shows a male snap component of the lanyard disconnected from an opening in a left temple rest.

As shown in FIGS. 2 and 3, the first coupling member 160 of the connection assembly releasably couples an end of the connecting member 120 to the glasses 10. In this illustrative embodiment, the first coupling member 160 includes a male snap component 160 which can be inserted into an opening in one of the temple rests. As shown in FIGS. 2 and 3, the left temple rest 30 includes an opening 170, which is sized so that the male snap component 160 of the first coupling member can be inserted and releasably locked therein by snapping into the opening 170. It is understood that the opening 170 may be located in either the left or the right temple rest, or in both temple rests for the wearer's convenience. As shown in FIG. 3, the opening 170 for coupling with the male snap component 160 is located at approximately a halfway point in height of the left temple rest 30 (or right temple rest 50). However, the positioning of the opening may be varied so as to make the glasses aesthetically pleasing while accomplishing the required functionality.

As an alternative to using the retractable spring loaded lanyard reel 130 shown in FIG. 3, other configurations of second coupling assembly may be used that can clip or otherwise attach to the wearer or wearer's clothing or accessories. For example, a holster with a storage compartment for storing the glasses and coupled to one end of the connecting member 120 may be used as the second coupling assembly. In such embodiments, the holster can connect to the wearer's clothing, belt or the like by a suitable attachment mechanism, such as a clip.

As mentioned above, FIG. 1 shows the glasses 10 being worn by a wearer. FIG. 2 is an enlarged detailed version of FIG. 1 and shows in more detail the attachment of the first coupling assembly 160 to the temple rest 30 of the frame of the glasses 10. FIG. 3 shows a detailed version of the first coupling assembly 160 disconnected the temple rest 30 of the frame. In particular, in FIG. 3, the male snap component of the first coupling assembly 160 is disconnected from the opening 170 in the temple rest 30 of the frame. The male snap component is shaped so that it tapers toward the central portion of its length, which allows this component to snap into the opening 170 in the temple rest without falling out. As shown in FIGS. 1-3, the male snap component of the first coupling assembly 160 is formed on a tab member, which is flexibly connected to the connecting member 120 by a triangular connection piece. However, the specific construction of the first coupling assembly 130 and its connection to the connecting member 120 shown in FIGS. 1-3 is illustrative and may be varied.

FIG. 3 also shows the spring clip 150 of the second coupling assembly 130 with more detail. As can be seen, the spring clip 150 allows the wearer 180 to easily attach the second coupling assembly 130 to various clothing portions of the wearer, such as a pocket or a belt of the wearer 180. As discussed above, the configuration of the spring clip 150 is illustrative and may be varied, or any other connection component may be used instead of the spring clip 150 to connect the second coupling assembly 130 to the wearer or wearer's clothing.

FIG. 4 is a view of folded glasses 20, which have the same configuration as the glasses 10 in FIGS. 1-3 and which are hanging from the connecting member 120 in a retracted state with respect to the second coupling assembly 130. As can be seen, FIG. 4 shows a wearer 180, wearing a suit, shirt and tie, and having the folded glasses 20 attached to the shirt collar of the wearer by the second coupling assembly 130 and the retracted connecting member 120. As can be seen in FIG. 4, the glasses 20 are folded at the frame hinge 190 and the temple rests 40, 60, which have the same configuration as the temple rests 30, 50 of FIGS. 1-3, are also folded.

Figure 7:
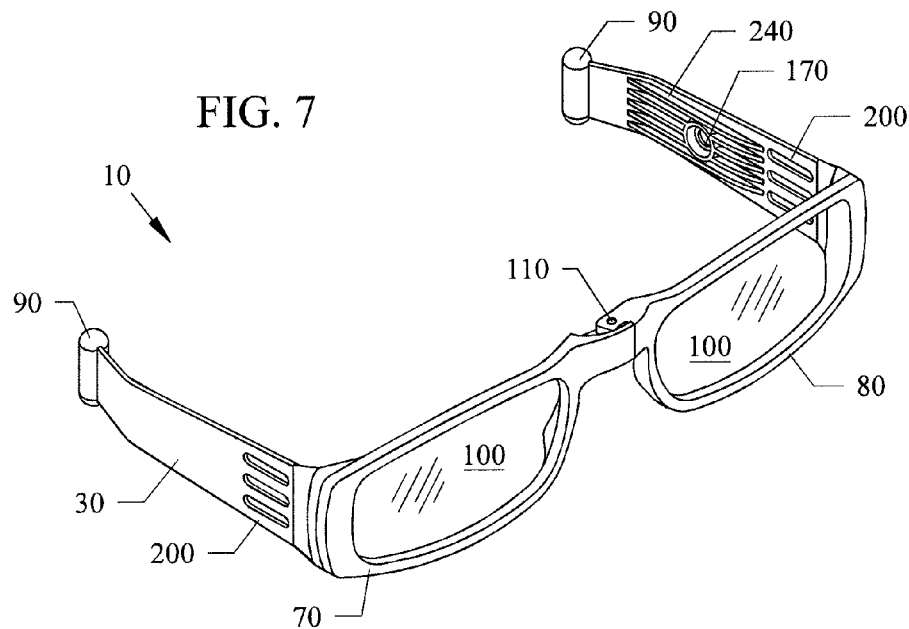
FIG. 7 is a front right perspective view of the eyeglass assembly of FIG. 5.
Figure 8:
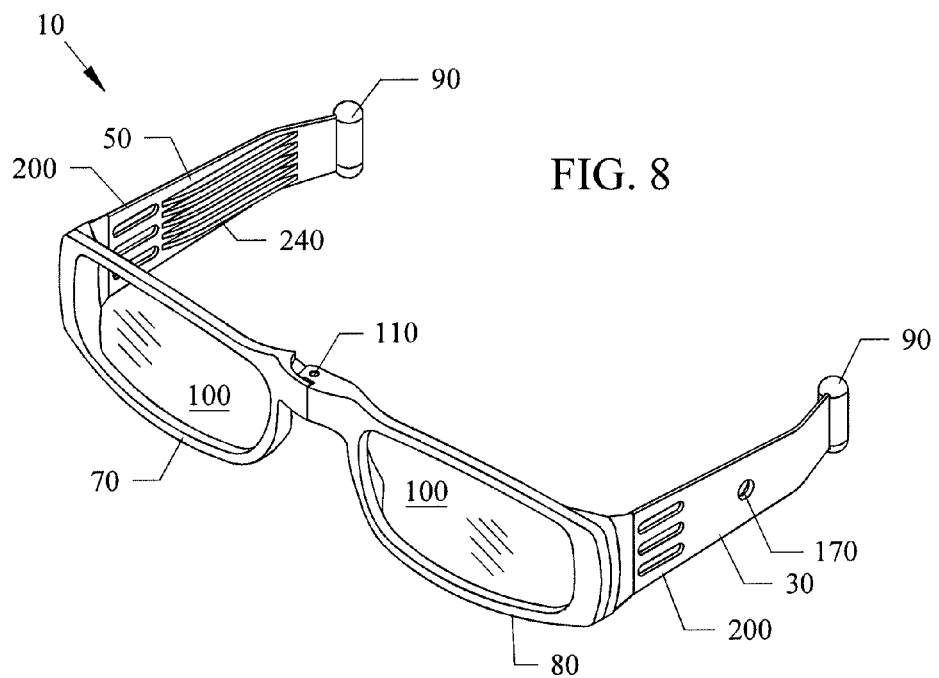
FIG. 8 is a front left perspective view of the eyeglass assembly of FIG. 5.
Figure 13:
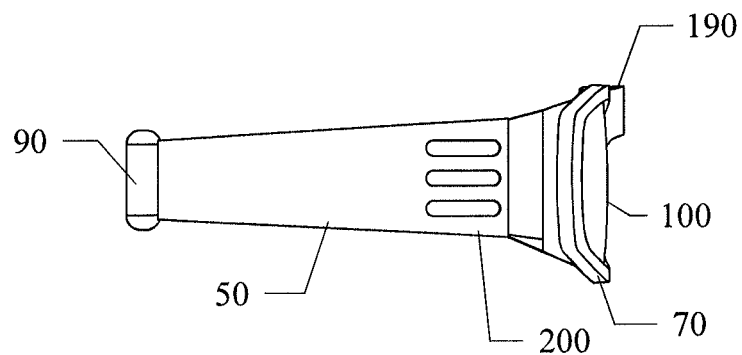
FIG. 13 is a right view of the eyeglass assembly of FIG. 9.
Figure 14:
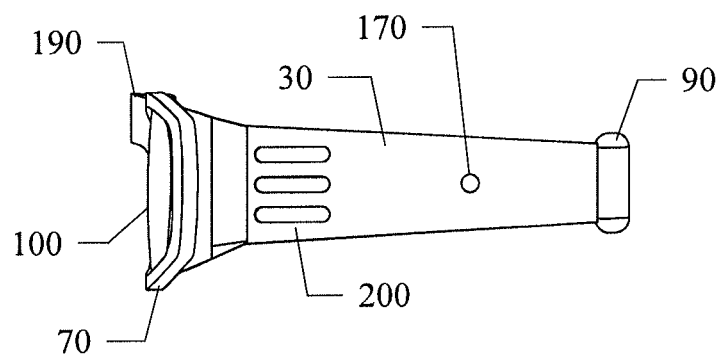
FIG. 14 is a left view of the eyeglass assembly of FIG. 9.
Figure 15:
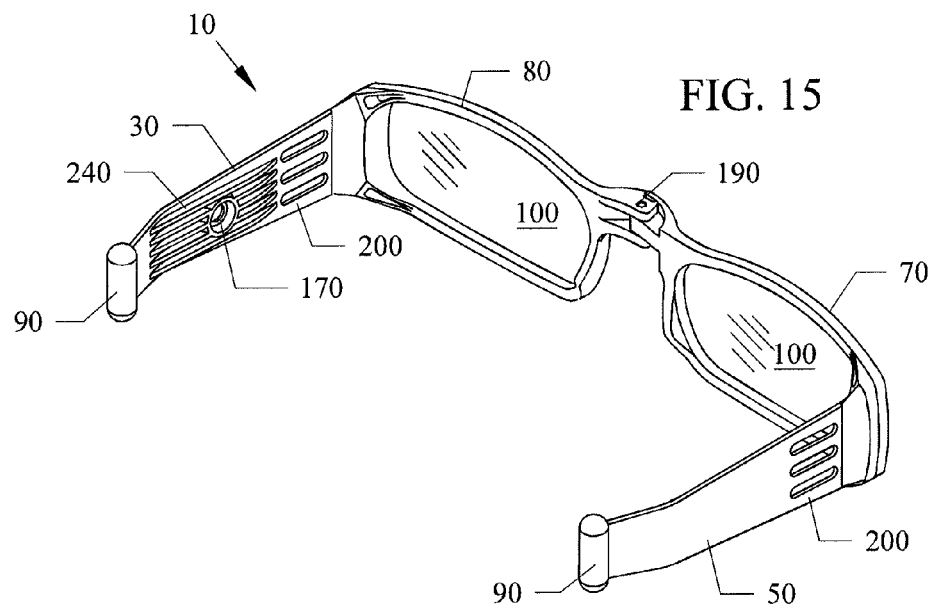
FIG. 15 is a rear right perspective view of the eyeglass assembly in a fully deployed state.
Figure 16:
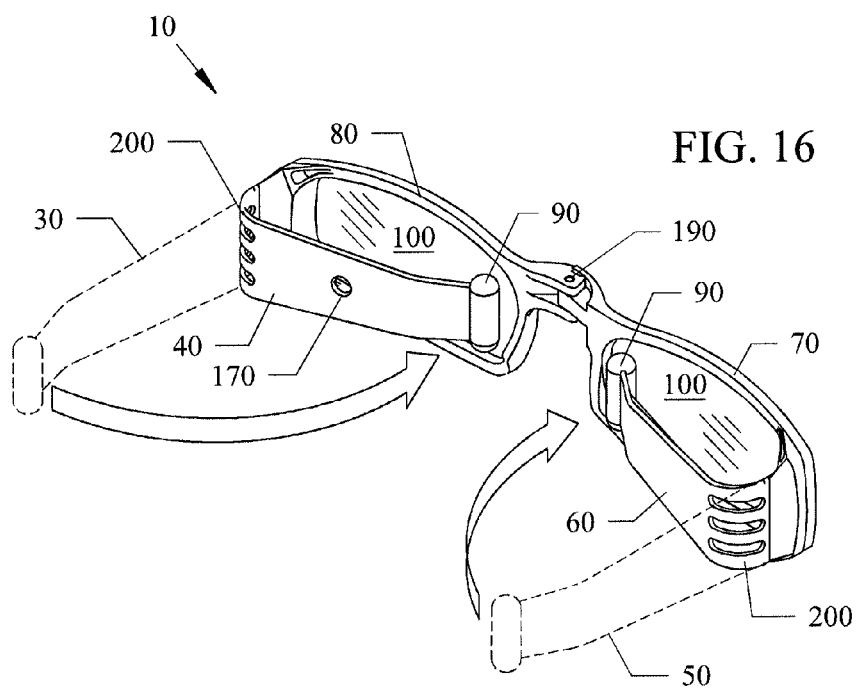
FIG. 16 is a rear right perspective view of the eyeglass assembly with temple rests folded.
Figure 17:
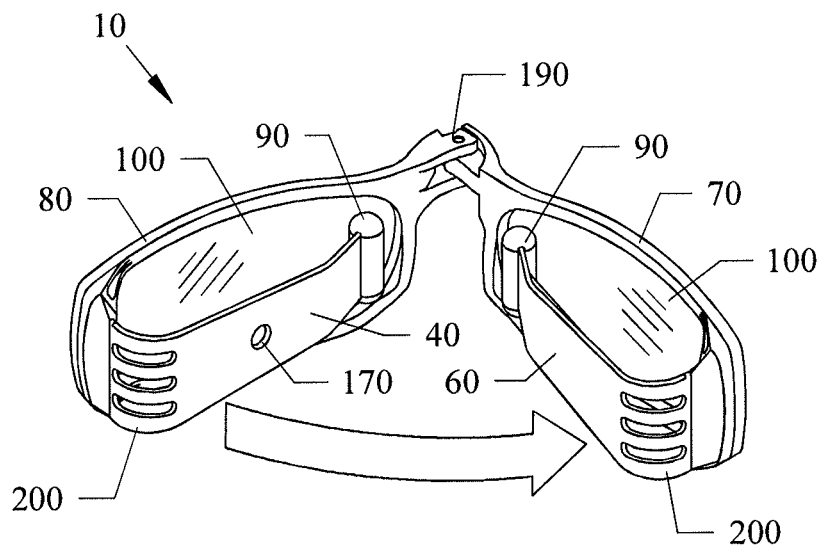
FIG. 17 is a view of FIG. 16 with the frame components beginning to be folded.
Figure 18:
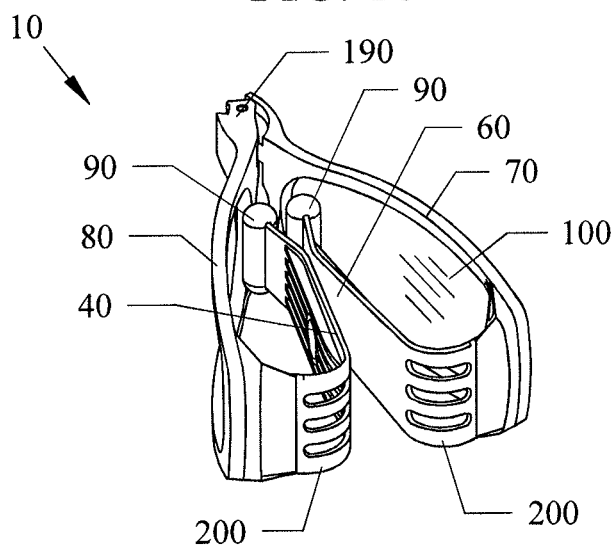
FIG. 18 is a view of the eyeglass assembly of FIG. 16 in a fully folded state.
Figure 19:
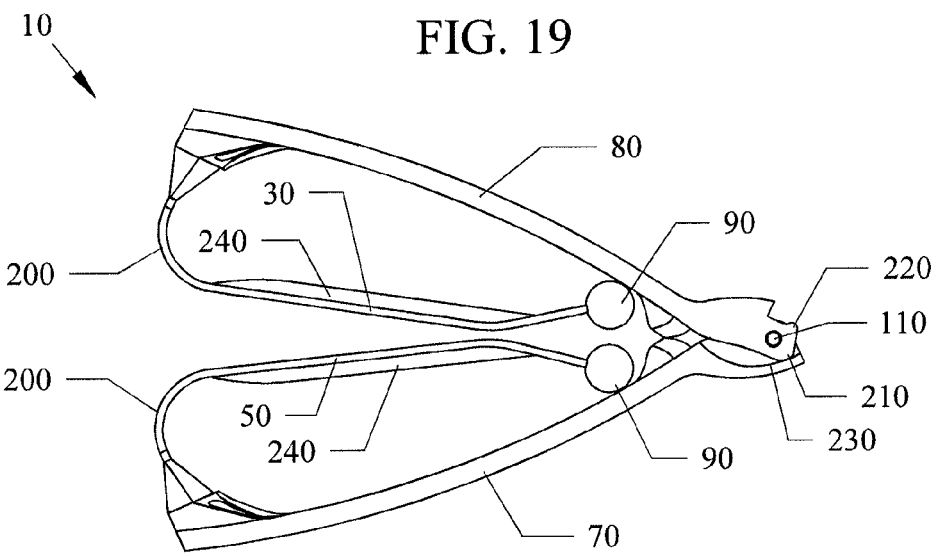
FIG. 19 is a top view of the eyeglass assembly of FIG. 18.
Figure 20:
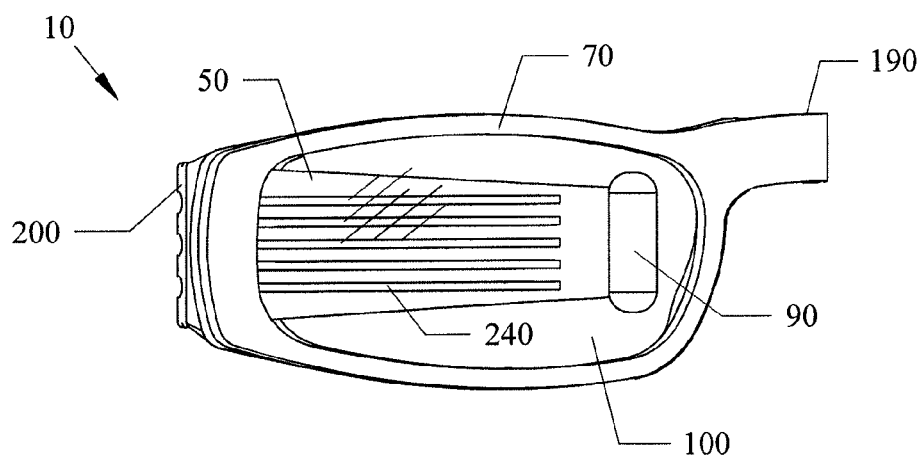
FIG. 20 is a front view of the eyeglass assembly of FIG. 18.
Figure 21:
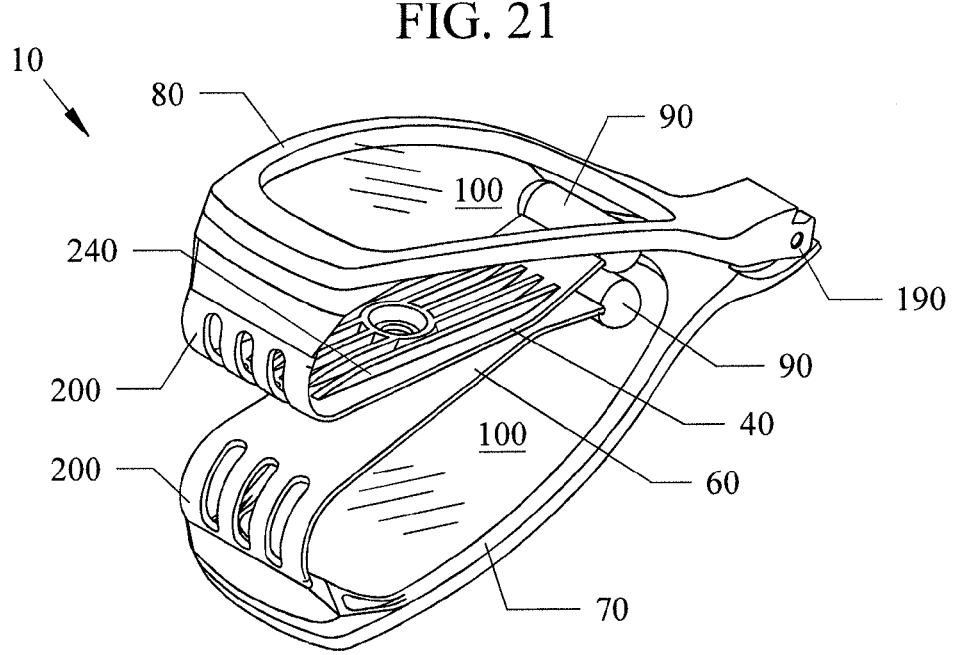
FIG. 21 is a top perspective view of the eyeglass assembly of FIG. 18.
Figure 22:
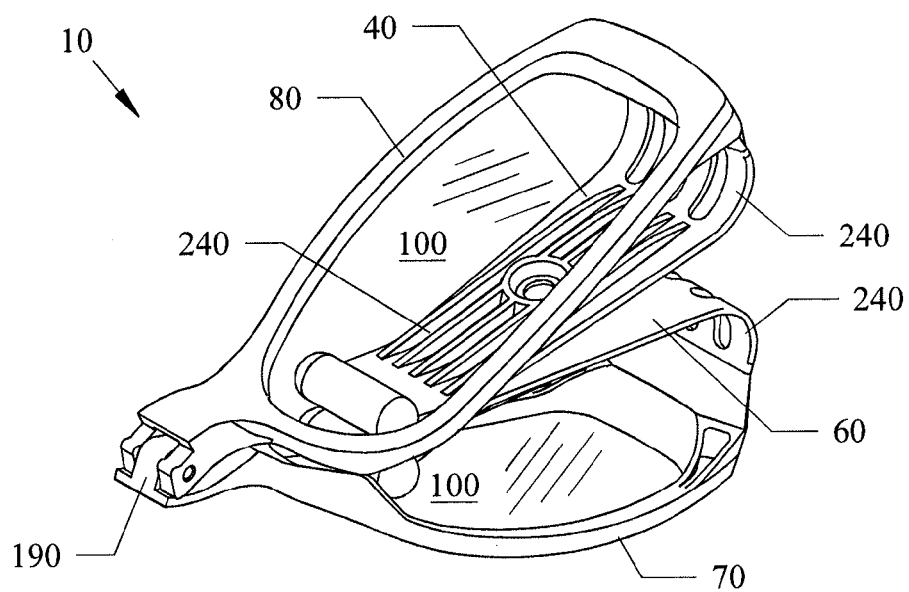
FIG. 22 is a bottom perspective view of the eyeglass assembly of FIG. 18.

FIGS. 5 and 6 show a rear left perspective view and a rear right perspective view of the frame of the glasses 10 with deployed or unfolded temple rests 30, 50. FIG. 15 also shows a rear right perspective view of the frame with deployed or unfolded temple rests 30, 50, while FIG. 16 shows the same temple rests 40, 60 in the folded position. In addition, FIGS. 7 and 8 show front left and front right perspective views of the frame with deployed temple rests 30, 50, and FIGS. 13 and 14 show side views of the frame with the temple rests 30, 50 deployed. As shown, the living hinge of each temple rest 30, 50 (40, 60 when folded) includes one or more elongated openings therein which increase the flexibility of the living hinge 200 so that the temple rests can fold with respect to the frame components 80, 70, as shown in FIG. 16. In addition, each temple rest 30, 50 includes a plurality of stiffening ribs 240 extending along the length of the temple rest on an inside surface thereof, which reduce the flexibility of the temple rests in the area outside of the living hinge so that only the hinge 200 is bent when the temple rests 40, 60 are folded. The number of elongated openings in each hinge 200 and the number of stiffening ribs 240 in each temple rest, and their size may be varied depending on the materials used to form the frame of the glasses and requirements of the glasses. Alternatively, the living hinge 200 may be formed by a thinned out area between each frame component and respective temple rest while the temple rest itself has increased thickness. The other components of the glasses 10 shown in FIGS. 5-8 and 13-16 are the same or substantially the same as those in FIGS. 1-3 and thus, the description thereof will be omitted.

Folding of the temple rests 40, 60 with respect to the respective frame components 80, 70 and the folding of the frame components with respect to one another to bring the frame of the glasses 10 into a collapsed state is shown in FIGS. 16-23. In particular, FIG. 16 is a rear right perspective view of the glasses 10 with the temple rests 40, 60 in their folded positions, and the previous, unfolded positions of the temple rests 30, 50 are shown in broken lines. After the temple rests 40, 60 of the glasses are folded, the frame components 70, 80 may then be folded with respect to one another, as shown by an arrow in FIG. 17. When the temple rests 40, 60 are folded and the frame components 70, 80 are also brought into the folded state, the frame of the glasses is in a collapsed state, as shown in FIGS. 18-23 which illustrate various views of the collapsed glasses. Due to the size of the temple rests and other features of the frame of the present invention, the glasses may be folded into a very compact collapsed size so that they can then be easily stored in a smaller storage compartment.

Figure 9:
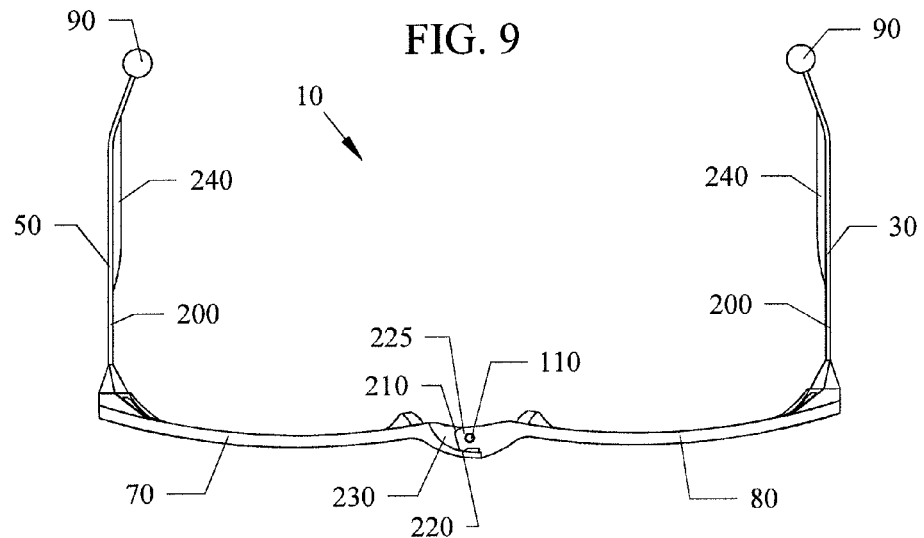
FIG. 9 is a top view of the eyeglass assembly with temple rests deployed.
Figure 10:
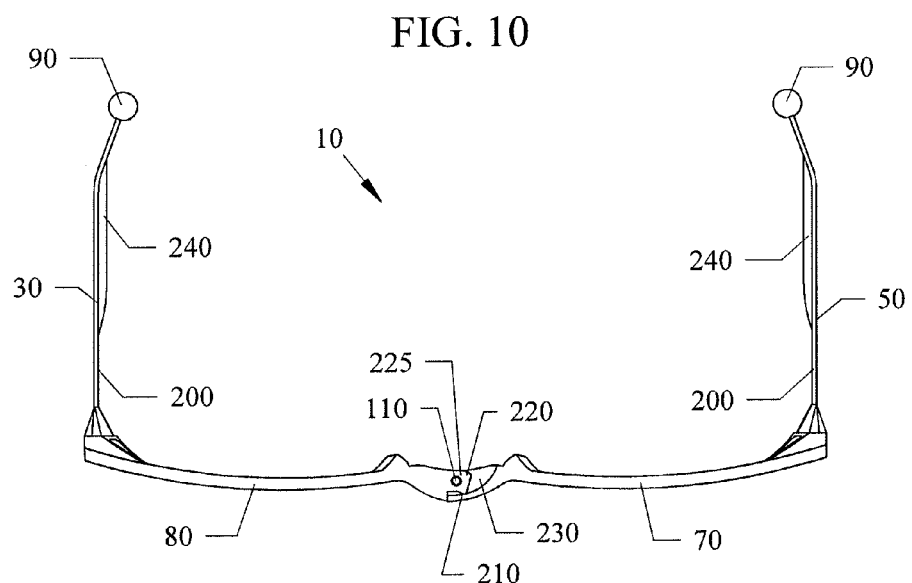
FIG. 10 is a bottom view of the eyeglass assembly of FIG. 9.
Figure 11:
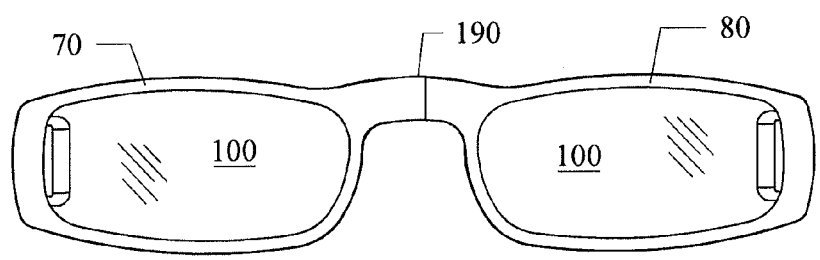
FIG. 11 is a front view of the eyeglass assembly of FIG. 9.
Figure 12:
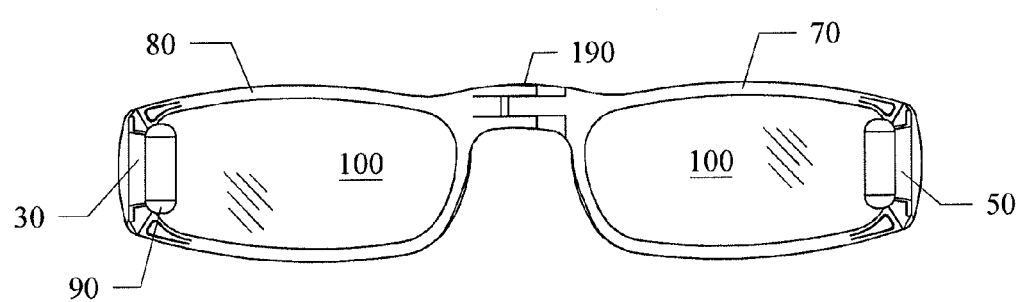
FIG. 12 is rear view of the eyeglass assembly of FIG. 9.
Figure 24A:
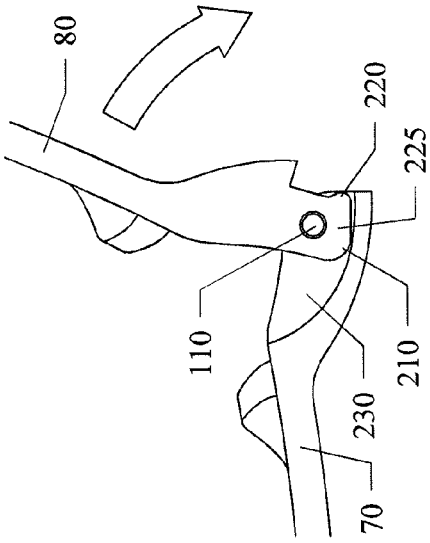
FIGS. 24A-24D show details of the hinge components of the eyeglass assembly as the hinge is deployed.
Figure 24B:
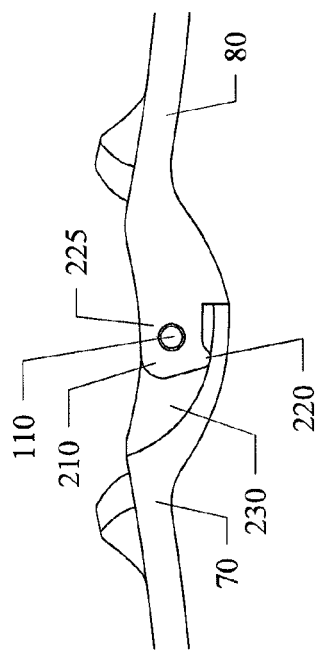
Figure 24C:
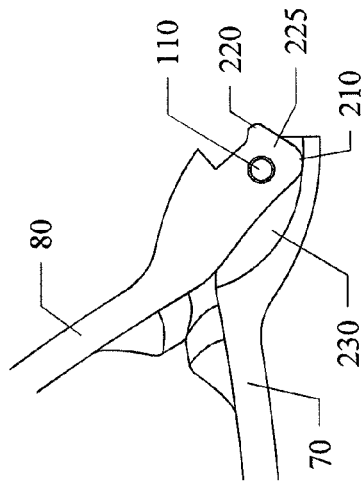
Figure 24D:
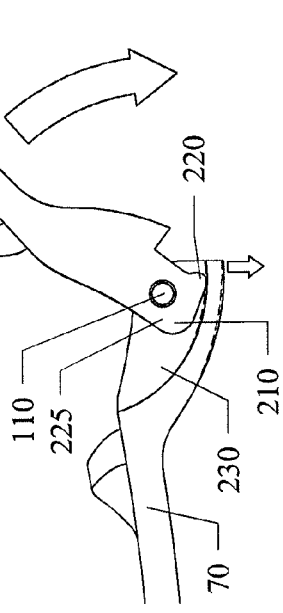

As described above, the frame components of the glasses are coupled to one another by a hinge 190 so as to allow the glasses to be collapsed. FIG. 5A shows a detailed view of the frame hinge between the left and right frame components and portions of the frame components surrounding the hinge. The frame hinge 190 and its operation are also shown in detail in FIGS. 24A-24D, which are detailed views of the hinge shown in FIG. 23. In particular, FIGS. 5A and 24D show the frame hinge 190 in an open or unfolded and locked state, FIG. 24A shows the frame hinge 190 in a folded state, while FIGS. 24B and 24C show the frame hinge 190 as the frame components are being unfolded from the folded state to the unfolded and locked state. Moreover, FIGS. 9 and 10 show top and bottom views of the glasses 10, including top and bottom views of the frame hinge.

As shown in FIGS. 5A, 9, 10 and 24A-D, the frame hinge is formed by two adjacent ends of the left and right frame components defining a bridge, wherein an end of one frame component forms first and second cam sockets or recesses 230 and an end of another frame component forms first and second cams 225, each having cam lock portions 210, 220, that fit into the respective first and second cam sockets 230. The two ends of the frame components are connected by a pivot pin 110. In the illustrative embodiment, the first cam recess 230 extends from a bottom surface and partially into the thickness of the frame component's end, while the second cam recess 230 extends from an upper surface and partially into the thickness of the frame component's end, so that the first and second cam recesses are separated by a wall portion. A front wall of the frame component's end defines a curved sidewall around a front portion of each cam recess 230, and as can be seen in FIG. 5A, the front wall also forms a smooth transition with the other frame component's end so that the hinge components are not visible when the frame is viewed from the front. The frame component's end where the cam recesses 230 are formed is sufficiently elastic and flexible so that it can act as a spring against the force of the cam lock portions 210, 220 sliding within the cam recesses and along the curved sidewall around the front portion of the recesses. The elasticity and flexibility of the cam recess 230 can be ensured by selecting appropriate materials for the frame components and by providing an appropriate thickness of the frame component's end. The elasticity of the frame component's end can be seen in FIG. 24C which shows the cam lock portion 220 slightly deforming the curved sidewall around the front portion of the cam recess 230 as the cam lock portion 220 is slid along the curved sidewall.

As shown in FIGS. 5A, 9, 10 and 24A-D, the other frame component's end forming the frame hinge 190 includes the first and second cams 225 which are configured to fit into and to rotate or slide within the respective first and second cam recesses 230. As can be seen in FIG. 5A, the first and second cams 225 are spaced from one another so that each cam fits into the respective cam recess 230 and the wall of the first frame component's end separating the first and second recesses 230 is disposed in the space between the first and second cams 225. As also shown in FIG. 5A, the pivot pin 110 connects the first and second cams 225 to the wall of the first frame component's end separating the first and second recesses 230. As mentioned above, each of the first and second cams 225 includes cam lock portions 210, 220 which facilitate locking the frame components in an open or unfolded position or in a closed or folded position. The cam lock portion 210 is a fold lock cam portion which is configured to lock the frame hinge in the folded position so as to prevent unfolding of the frame components. As shown in FIGS. 24A-24B, the fold lock cam portion 210 is formed as a rounded corner edge of the cam 225 which is shaped and sized so that it applies a force against the sidewall around the front portion of the respective cam recess when the frame components are folded and unfolded. The sliding of the fold lock cam portion 210 against the sidewall around the front portion of the cam recess is shown in FIG. 24A, in which the frame components are folded and locked by the fold lock cam portion 210 and in FIG. 24B, in which the frame components are being unfolded and have just been unlocked.

As also shown in FIGS. 24A-D, the cam lock portion 220 is an open lock cam portion 220 which is formed as a projection on another corner of the cam 225. The open lock cam portion 220 locks the frame components in place when they are in an unfolded state. As shown in FIGS. 24C-D, when the frame components are unfolded, the open lock cam portion 220 applies a force on the sidewall around the front portion of the respective cam recess 230 and causes the sidewall to deform slightly as it slides along the sidewall. In this way, when the frame components are unfolded, they are locked in the unfolded state to prevent folding of the frame components when the frame is worn. As shown in FIG. 24D and visible in FIGS. 5A, 9, 10, 11, 15 and 16, when the frame components are unfolded and locked in the unfolded position, front surfaces of the frame components in the hinge area are continuous with one another. That is, the front surface of the sidewall around the front portions of the cam recesses of the first frame component and the front surface of a sidewall that extends from the cams 225 of the other frame component are continuous with one another in the hinge area.

Although FIGS. 24A-D show only one of the cams 225 and one respective cam recess 230, it is understood that the constructions of the other cam and of the other cam recess are substantially the same. In addition, although in the illustrative embodiment shown, the cam recesses 230 are formed in the end portion of the right frame component 70 and the cams 225 are formed in the end portion of the left frame component 80, in other embodiments, the cam recesses 230 may be formed in the left frame component 80, while the cams 225 may be formed in the right frame component 70. Moreover, the configuration of the frame hinge 190 described above and shown in the drawings is illustrative, and other hinge configurations with or without locking mechanisms are contemplated by the invention.

Although the frame of the glasses 10 shown in FIGS. 1-24D include separate left and right frame components which are hinged to one another, in other embodiments, the hinge assembly may be eliminated so that the left and right frame components of the frame are integrally formed with one another. In such embodiments, the left and right frame components may not be foldable with respect to one another and only the temple rests may be folded and unfolded with respect to the frame components. In addition, where living hinges are employed between the frame components and the respective temple rests, the whole frame, including the frame components and the temple rests of such embodiments may be integrally formed. In yet other embodiments, the left and right frame components may be integrally formed with a living hinge therebetween, in place of the hinge 190, so that the left and right frame components may be folded and unfolded with respect to one another.

Figure 25:
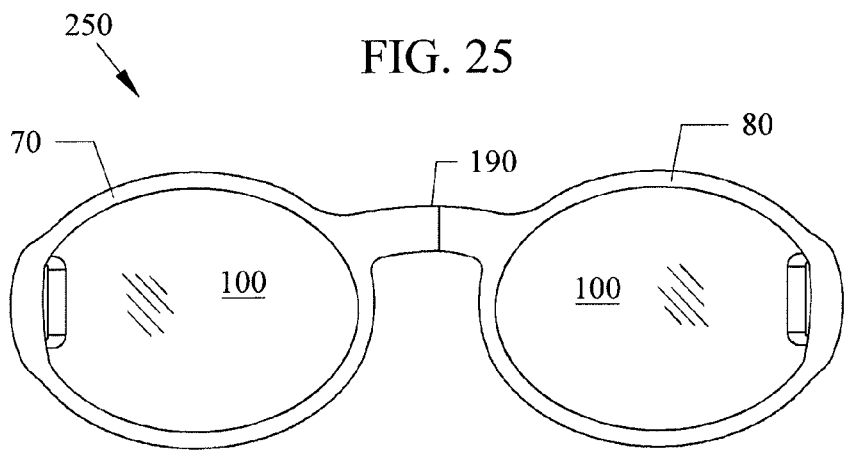
FIG. 25 is a front view of another embodiment of the eyeglass assembly with a round/oval frame shape.
Figure 26:
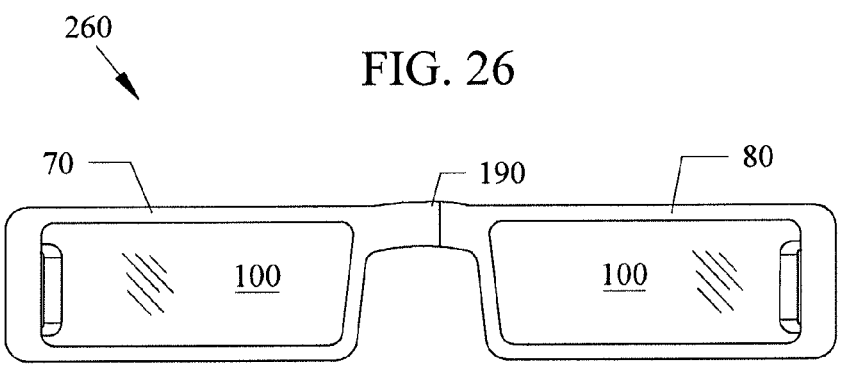
FIG. 26 is a front view of a third embodiment of the eyeglass assembly with a rectangular frame shape.

Moreover, although FIGS. 1-23 show one configuration of the glasses 10 which have a particular shape of the frame components and temple rests, it is understood that the shape of the frame, including the shapes of the frame components and the temple rests, may be varied so as to create numerous different designs and styles of the glasses. For example, the frame components may be formed so as to support round or oval shaped lenses, as shown in FIG. 25, or to support substantially rectangular shaped lenses, as shown in FIG. 26. In any case, it is understood that the shapes and designs of the frame components, the lenses and the temple rests may be varied to suit the particular wearer.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A frame for eyeglasses comprising:
a front frame portion adapted to support lenses; and
first and second side portions extending from opposing sides of the front frame portion and configured to end at a user's temples so as to be supported by the user's temples when worn, without being supported by the user's ears,
wherein the first side portion is integrally formed with the front frame portion and is hinged relative to the front frame portion by a first living hinge, and the second side portion is integrally formed with the front frame portion and is hinged relative to the front frame portion by a second living hinge, and
wherein each of the first and second living hinges include one or more openings therein for increasing flexibility of the first and second living hinges and each of the first and second side portions include at least one stiffening member for reducing flexibility of the first and second side portions wherein the thickness of the first and second living hinges is substantially the same thickness of the first and second side portions, not including the stiffening members provided on the first and second side portions.

2. The frame of claim 1, wherein:
the front frame portion comprises a right frame component adapted to support a first lens and a left frame component adapted to support a second lens, and
the right frame component and the left frame component are hingedly connected by a frame hinge, the frame hinge allowing the right frame component and the left frame component to fold with respect to one another.

3. The frame of claim 2, wherein the frame hinge includes a first locking portion for retaining the right and left frame components in an unfolded state and a second locking portion for retaining the right and left frame components in a folded state.

4. The frame of claim 3, wherein:
the right and left frame components are formed from a memory polymer material,
the frame hinge is formed by a first end of the right frame component and a second end of the left frame component adjacent to the first end of the right frame component and hingedly connected to the first end of the right frame component,
one of the first end of the right frame component and the second end the left frame component comprises a cam portion including the first and second locking portions and the other of the first end of the right frame component and the second end of the left frame component comprises a recess, wherein when the right and left frame components are folded or unfolded, the cam portion slides within the recess and a wall defining the recess acts as a spring against a force exerted by the first and second locking portions of the cam portion.

5. The frame of claim 1, wherein the first side portion includes a first tip formed at an end thereof and the second side portion includes a second tip formed at an end thereof, the first and second tips being configured to contact with a user's temples when worn by the user.

6. The frame of claim 5, wherein the first and second side portions are formed from a memory polymer material, and the first and second tips are formed from one of a low durometer rubber, silicone rubber and another material softer than the memory polymer material.

7. The frame of claim 6, wherein each of the first and second tips include a 3-dimensional pattern on at least a portion of an outer surface thereof adapted to contact a user's temple so as to improve support of the frame by the first and second tips on the user's temples when worn by the user.

8. The frame of claim 1, wherein at least the first and second side portions are formed from a memory polymer material comprising one or more of amorphous polyamides, partially aromatic polyamides and cycloaliphatic polyamides.

9. The frame of claim 1, wherein the frame further includes a coupling portion adapted to releasably couple with a connection assembly for connecting the frame to a user or a user's clothing.

10. The frame of claim 9, wherein the coupling portion comprises an opening in one of the first and second side portions adapted to receive a male snap portion of the connection assembly.

11. An eye glass assembly comprising a collapsible eyeglass frame and a connection assembly for releasably connecting the collapsible frame to a user or a user's clothing, wherein
the collapsible eyeglass frame includes:
a right frame component adapted to support a first lens;
a left frame component adapted to support a second lens;
a first side portion extending from the right frame component;
a second side portion extending from the left frame component; and
a coupling portion adapted to releasably couple with the connection assembly,
wherein:
the right frame component and the left frame component are hingedly connected to one another by a frame hinge and being foldable with respect to one another,
the first side portion is foldable with respect to the right frame component, the first side portion being integrally formed with the right frame component and hinged relative to the right frame component by a first living hinge,
the second side portion is foldable with respect to the left frame component the second side portion being integrally formed with the left frame component and hinged relative to the left frame component by a second living hinge, each of the first and second living hinges include one or more openings therein for increasing flexibility of the first and second living hinges and each of the first and second side portions include at least one stiffening member for reducing flexibility of the first and second side portions; and the connection assembly includes:

a connecting member;

a first coupling member provided at a first end of the connecting member and configured to releasably couple with the coupling portion of the collapsible frame; and a second coupling member provided at a second end of the connecting member and configured to releasably couple with a user or a user's clothing wherein the thickness of the first and second living hinges is substantially the same thickness of the first and second side portions, not including the stiffening members provided on the first and second side portions.

12. The eyeglass assembly of claim 11, wherein the first and second side portions are configured to end at a user's temples so as to be supported by the user's temples when worn, without being supported by the user's ears.

13. The eyeglass assembly of claim 12, wherein:

the first side portion includes a first tip formed at an end thereof and the second side portion includes a second tip formed at an end thereof, the first and second tips being configured to contact with a user's temples when worn by the user; and the first and second side portions are formed from a memory polymer material, and the first and second tips are formed from one of a low durometer rubber, silicone rubber and another material softer than the memory polymer material.

14. The eyeglass assembly of claim 13, wherein each of the first and second tips include a 3-dimensional pattern on at least a portion of an outer surface thereof adapted to contact a user's temple so as to improve support of the frame by the first and second tips on the user's temples when worn by the user.

15. The eyeglass assembly of claim 11, wherein at least the first and second side portions are formed from a memory polymer material comprising one or more of amorphous polyamides, partially aromatic polyamides and cycloaliphatic polyamides.

16. The eyeglass assembly of claim 11, wherein the coupling portion of the collapsible eyeglass frame comprises an opening in one of the first and second side portions, and the first coupling member comprises a male snap portion configured to be releasably inserted into the opening.

17. The eyeglass assembly of claim 11, wherein the connecting member comprises a lanyard, and the second coupling member includes a clip for coupling with a user or a user's clothing and a housing that encloses a retractable reel assembly coupled to the second end of the lanyard for retracting the lanyard therein and allowing extension of the lanyard therefrom.

18. The eyeglass assembly of claim 17, wherein the retractable reel assembly is a spring-loaded retractable reel assembly, and wherein the second coupling member further includes a release mechanism for locking and releasing the lanyard relative to the spring-loaded retractable reel assembly.

19. The eyeglass assembly in claim 11, wherein the second coupling member comprises a holster adapted to store the collapsible frame and a clip for coupling the holster with a user or a user's clothing.

20. The eyeglass assembly of claim 11, wherein:

the right and left frame components are formed from a memory polymer material, the frame hinge is formed by a first end of the right frame component and a second end of the left frame component adjacent to the first end of the right frame component and hingedly connected to the first end of the right frame component, one of the first end of the right frame component and the second end the left frame component comprises a cam portion including the first and second locking portions and the other of the first end of the right frame component and the second end of the left frame component comprises a recess, wherein when the right and left frame components are folded or unfolded, the cam portion slides within the recess and a wall defining the recess acts as a spring against a force exerted by the first and second locking portions of the cam portion.

\* \* \* \* \*